United States Patent
Leum et al.

(10) Patent No.: US 11,745,965 B2
(45) Date of Patent: Sep. 5, 2023

(54) VEHICLE LEVELER WITH SAFETY FEATURES

(71) Applicant: Leum Engineering, Inc., Minnetonka, MN (US)

(72) Inventors: Grant Leum, Excelsior, MN (US); Eric Demerath, Shepherd, MI (US)

(73) Assignee: Leum Engineering, Inc., Minnetonka, MN (US)

( * ) Notice: Subject to any disclaimer, the term of this patent is extended or adjusted under 35 U.S.C. 154(b) by 0 days.

(21) Appl. No.: 17/992,716

(22) Filed: Nov. 22, 2022

(65) Prior Publication Data
US 2023/0081995 A1 Mar. 16, 2023

Related U.S. Application Data

(63) Continuation of application No. 17/483,500, filed on Sep. 23, 2021, now Pat. No. 11,572,239, which is a continuation of application No. 17/026,642, filed on Sep. 21, 2020, now Pat. No. 11,273,998, which is a continuation-in-part of application No. 16/376,910, filed on Apr. 5, 2019, now Pat. No. 10,815,103.

(51) Int. Cl.
*B65G 69/00* (2006.01)

(52) U.S. Cl.
CPC ......... *B65G 69/006* (2013.01); *B65G 69/003* (2013.01)

(58) Field of Classification Search
CPC ........................... B65G 69/003; B65G 69/006
USPC ................................. 14/69.5–71.7; 414/401
See application file for complete search history.

(56) References Cited

U.S. PATENT DOCUMENTS

| | | | |
|---|---|---|---|
| 2,798,620 A | 7/1957 | Allan | |
| 4,348,780 A | 9/1982 | Angelo et al. | |
| 4,624,446 A | 11/1986 | Gould | |
| 4,765,792 A | 8/1988 | Cherry et al. | |
| 5,106,246 A | 4/1992 | Chance | |
| 5,381,575 A | 1/1995 | Silberman | |
| 6,349,441 B1 | 2/2002 | Kosuch | |
| 6,368,043 B1 * | 4/2002 | Leum | B65G 69/005 14/71.7 |
| 6,945,514 B1 | 9/2005 | Conwell | |
| 7,073,777 B2 | 7/2006 | Branstetter | |
| 7,316,043 B2 | 1/2008 | Henblad et al. | |
| 7,533,431 B2 | 5/2009 | Hochstein et al. | |
| 7,670,096 B2 | 3/2010 | Leum | |
| D640,854 S | 6/2011 | Leum | |
| 8,118,280 B2 | 2/2012 | Heinz | |

(Continued)

*Primary Examiner* — Raymond W Addie
(74) *Attorney, Agent, or Firm* — Jansson Munger McKinley & Kirby Ltd.

(57) ABSTRACT

A vehicle leveler includes a first portion which has a leading edge and a trailing edge; the trailing edge is disposed further from the driveway than the leading edge. The vehicle leveler also includes a second portion which has a leading edge and a trailing edge; the leading edge of the second portion is attached to the trailing edge of the first portion and the leading edge of the second portion is disposed further from the driveway than the trailing edge of the second portion. The second portion also includes an extension portion. The vehicle leveler has at least one tension bar connecting the first portion on a proximal end and a lift cylinder on a distal end as well as at least one tension strap. When the vehicle leveler is in an elevated position the tension bar and tension strap keeps the lift cylinder from accidentally shifting.

12 Claims, 13 Drawing Sheets

(56) References Cited

U.S. PATENT DOCUMENTS

| | | | |
|---|---|---|---|
| 9,162,831 B2 * | 10/2015 | De Jong | ............ B65G 69/005 |
| 2004/0154111 A1 | 8/2004 | Trask | |
| 2016/0374876 A1 | 12/2016 | Thornton et al. | |

* cited by examiner

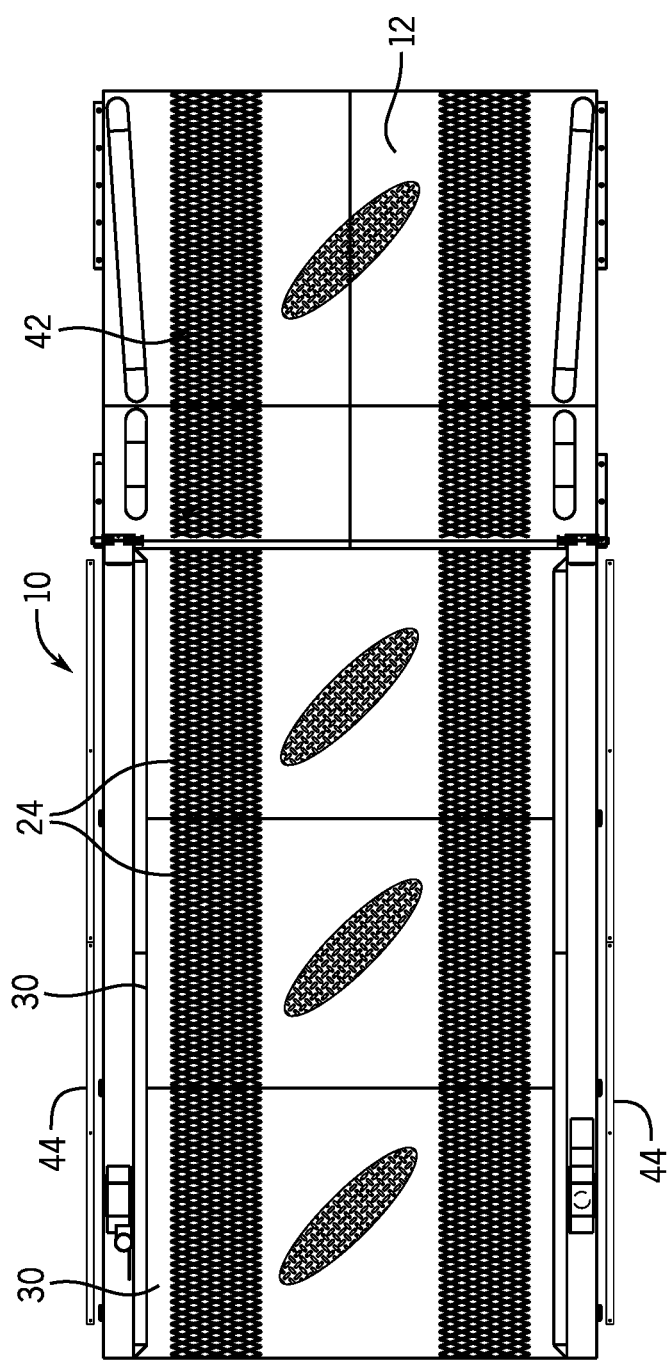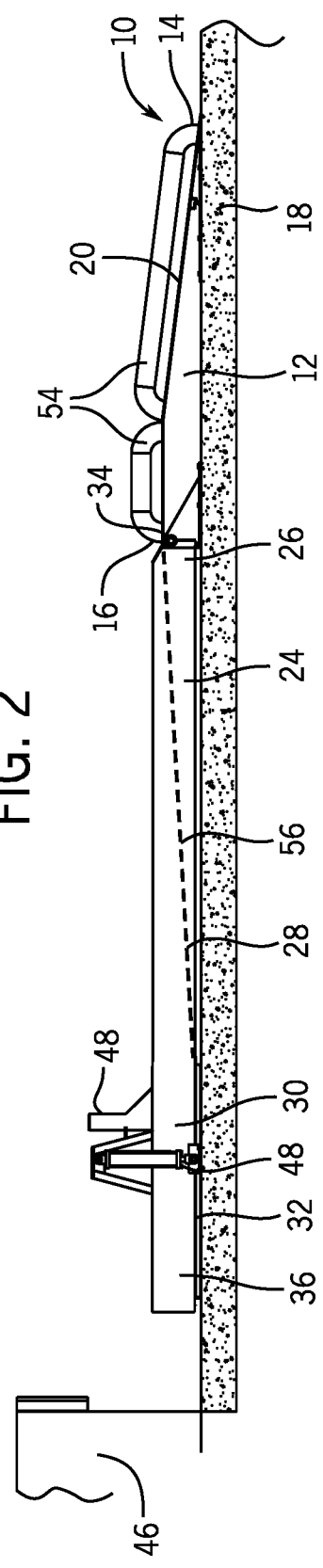

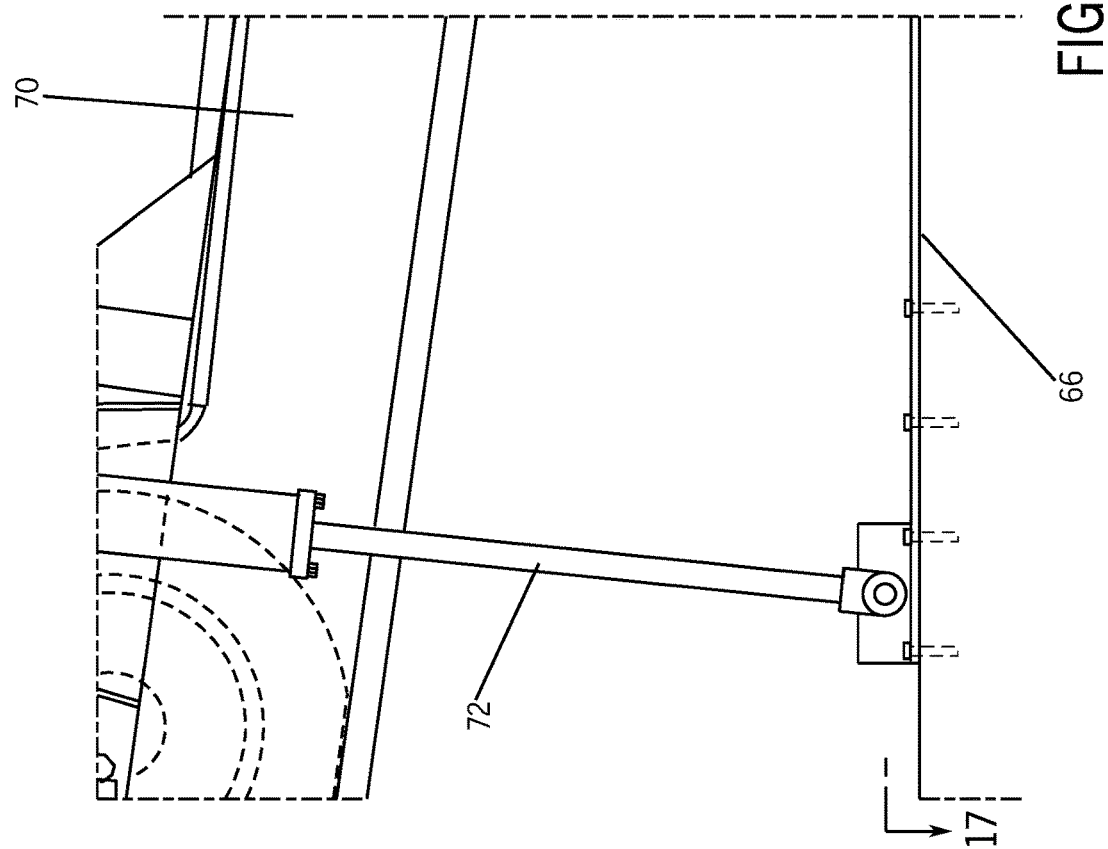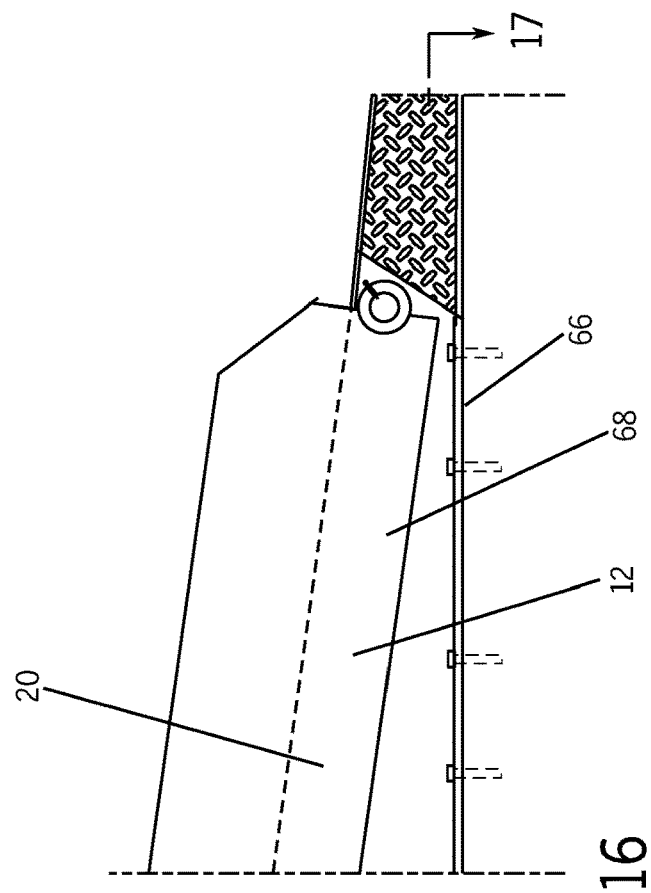
FIG. 16

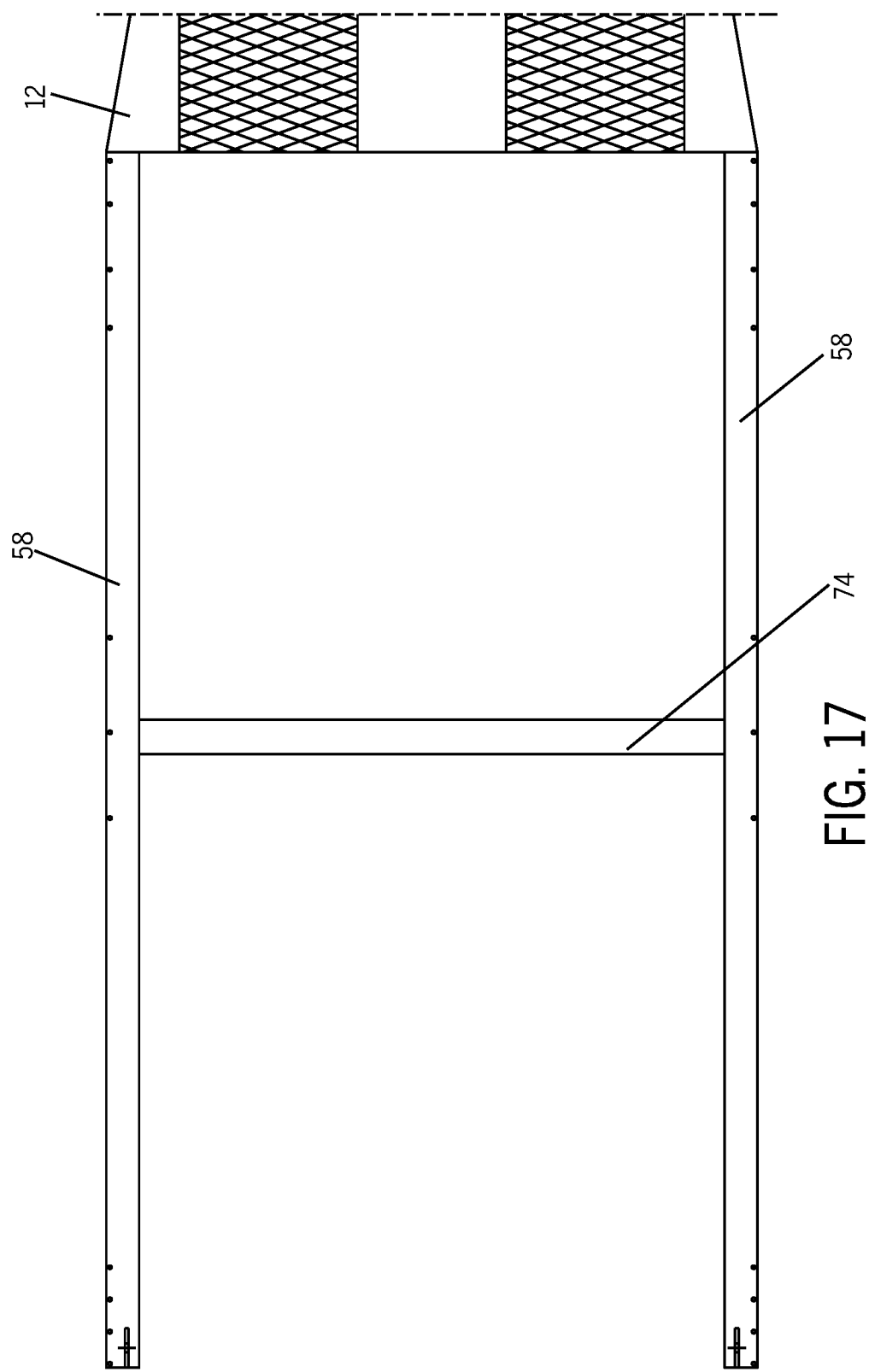

VEHICLE LEVELER WITH SAFETY FEATURES

RELATED APPLICATIONS

This application is a continuation of patent application Ser. No. 17/483,500, filed on Sep. 23, 2021, which is a continuation of patent application Ser. No. 17/026,642, filed on Sep. 21, 2020, now U.S. Pat. No. 11,273,998, which is a continuation-in-part of patent application Ser. No. 16/376,910 filed on Apr. 5, 2019, issued on Oct. 27, 2020 as U.S. Pat. No. 10,815,103. Such prior applications are incorporated by reference herein in their entirety.

FIELD OF THE INVENTION

This invention relates to vehicle levelers and more particularly to a vehicle leveler having multiple surface angles as well as safety features.

BACKGROUND OF THE INVENTION

A variety of truck levelers have been devised to adjust the height of different trailers to properly match the deck of the trailer to the height of the dock. By aligning the height of the trailer and the dock the loading and unloading of cargo is facilitated.

One such device is seen in U.S. Pat. No. 4,624,446 to Gould which discloses a reinforced platform pivotally mounted to the ground at one end and includes a support assembly having hydraulic cylinders. In operation the rear wheels of a truck trailer are backed onto the platform and then the non-mounted end of the platform is lifted by the hydraulic cylinders until the deck of the trailer is equal to the height of the dock.

A similar device is shown in U.S. Pat. No. 4,765,792 to Cherry, et al. which also discloses a pivotally mounted and hydraulically raised platform. In addition to the disclosure of Gould, the device includes mounting the hydraulics inwardly from the non-mounted end of the platform and an aperture in the non-mounted end of the platform to accommodate a truck restraining device.

Another design is disclosed in U.S. Pat. No. 6,368,043 to Leum, et al. which teaches a low-profile truck leveler. In this design a low-profile leveler is enabled through the use of a raised rear beam and two lateral beams that extend above the upper surface of the platform. In addition, a central beam adds further to the strength and rigidity of the leveler.

Vehicle levelers of the prior art typically have certain disadvantages. The majority of vehicle levelers have ramp surfaces which are not highly adjustable. This is a distinct disadvantage when vehicles are being loaded or unloaded with cargo. Levelers of the prior art are also not able to accommodate all types of vehicles. This is yet another disadvantage.

Some levelers of the prior art have certain shortcomings and disadvantages to which this device is drawn. Specifically, it would be advantageous to have a vehicle leveler which is highly adjustable and can elevate both the rear and front axles of a vehicle at the same time so as to minimize the slope of the internal floor of the vehicle and thereby allow safer loading and unloading of cargo. It would also be advantageous to have a vehicle leveler which has enhanced safety features, such as additional structural support to eliminate shifting of the leveler when it is in a raised position.

In summary, there are problems and shortcomings in the prior art vehicle levelers and it is to these needs that this device is drawn.

OBJECTS OF THE INVENTION

It is an object of this invention to provide a vehicle leveler which is highly adjustable and can elevate both the rear and front axles of a vehicle at the same time so as to minimize the slope of the internal floor of the vehicle or trailer.

Another object of this invention is to provide a vehicle leveler which has improved safety during loading and unloading of cargo from a vehicle which is on the leveler.

Yet another object of this invention is to provide a safe walkway surface, so as to give the vehicle driver a wide walking surface to assist them as they step into and out of a vehicle as well as when they walk around adjacent trailers.

Yet another object of this invention is to provide enhanced safety and stability when the leveler is a raised position.

These and other objects of the invention will be apparent from the following descriptions and from the drawings.

SUMMARY OF THE INVENTION

The preferred embodiment of the invention includes a vehicle leveler for use with a driveway which includes a first portion having a leading edge and a trailing edge. The trailing edge is disposed further from the driveway than the leading edge and forms a ramp section. The second portion also includes an extension portion which extends from the trailing edge of the second portion toward the rear of the leveler and includes a substantially flat section disposed about parallel with the substantially flat driveway. The first portion and second portion are each unitary structures. It is highly preferable that the vehicle leveler includes opposing side portions which extend the length of and contact the second portion and extension portion, the opposing side portions having a top surface which forms a walkway.

In highly preferred applications, two or more vehicle levelers can be installed adjacent to each other and an extended walkway surface can be removably installed between each vehicle leveler to form a large surface for a vehicle driver to use. It is preferable that the extended walkway surface and top surface form a large walkway for a vehicle driver. In some preferred embodiments each vehicle leveler has two, opposing top surfaces which each form a separate walkway. The walkway can extend the complete length of the top surface in some preferred embodiments or it can only extend a portion of the length of the top surface.

Preferably, the walkway and extended walkway surface include metal grating for a safe contact surface for a vehicle driver walking on the walkway or extended walkway surface.

It is preferred that the second portion including the extension portion be moveable between a lowered position and a raised position to accommodate varying dock heights for loading and unloading of cargo from vehicles. It is also preferable that the ramp section be of varying lengths and heights to accommodate a single, rear axle vehicle as well as a large trailer.

It is highly preferred that at least one tension bar connects the first portion on a proximal end to a lift cylinder on a distal end. Preferable embodiments also include a tension bar on each side of the vehicle leveler. It is also highly preferred that at least one tension strap (but preferably several) is under the first portion, second portion or extension portion and that it connects on each end to the two, opposing side portions.

BRIEF DESCRIPTION OF THE DRAWINGS

The drawings illustrate preferred embodiments including the above-noted characteristics and features of the device. The device will be readily understood from the descriptions and drawings. In the drawings:

FIG. 1 is a perspective view of the vehicle leveler;

FIG. 2 is a top view of the vehicle leveler in FIG. 1;

FIG. 16 is a sectional view of the tension bar and vehicle leveler of FIG. 15 taken along line 16-16; and FIG. 17 is a sectional view of the tension strap and vehicle leveler of FIG. 16 taken along line 17-17;

DETAILED DESCRIPTION OF PREFERRED EMBODIMENTS

Figure 3:
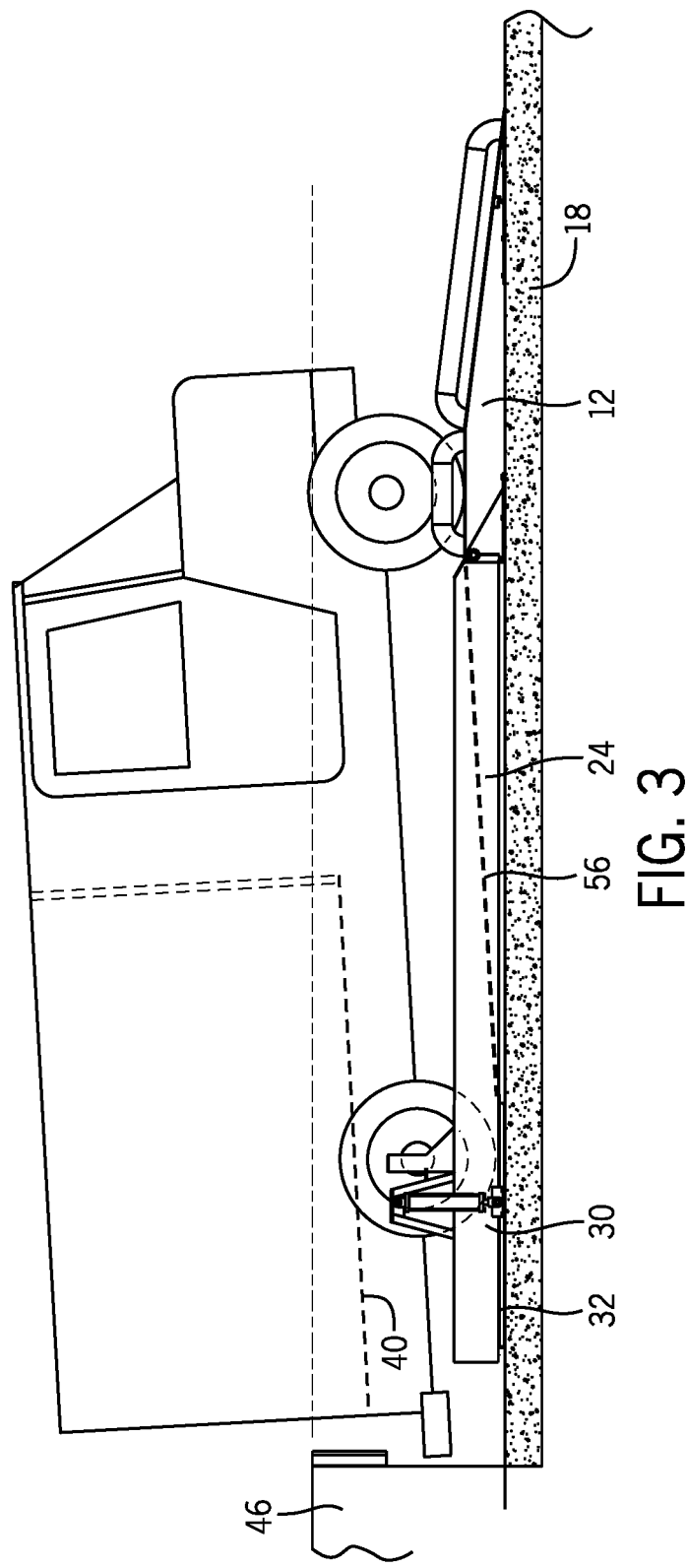
FIG. 3 is a perspective view of the vehicle leveler of FIG. 1 with a truck on the leveler and the leveler in the lowered position.

A preferred embodiment of the present invention is shown in FIGS. 1-17. Vehicle leveler 10, as shown in FIG. 1, includes three primary portions; a first portion 12, a second portion 24 and an extension portion 30. Leveler 10 is designed to be utilized in conjunction with a substantially flat driveway 18 near a loading dock wall 46. Furthermore leveler 10 can be moved between a lowered position 36 shown in FIGS. 1 and 3, and a raised position 38 shown in FIGS. 4-6.

First portion 12 includes a leading edge 14 and a trailing edge 16. Trailing edge 16 is disposed further from driveway 18 than leading edge 14. First portion 12 has a ramp section 20 which is inclined upwards and in some embodiments includes a flat section 22 adjacent ramp section 20. First portion 12 in other embodiments does not have a flat section 22 but instead just inclines the total distance from leading edge 14 to trailing edge 16 of first portion 12.

Figure 4:
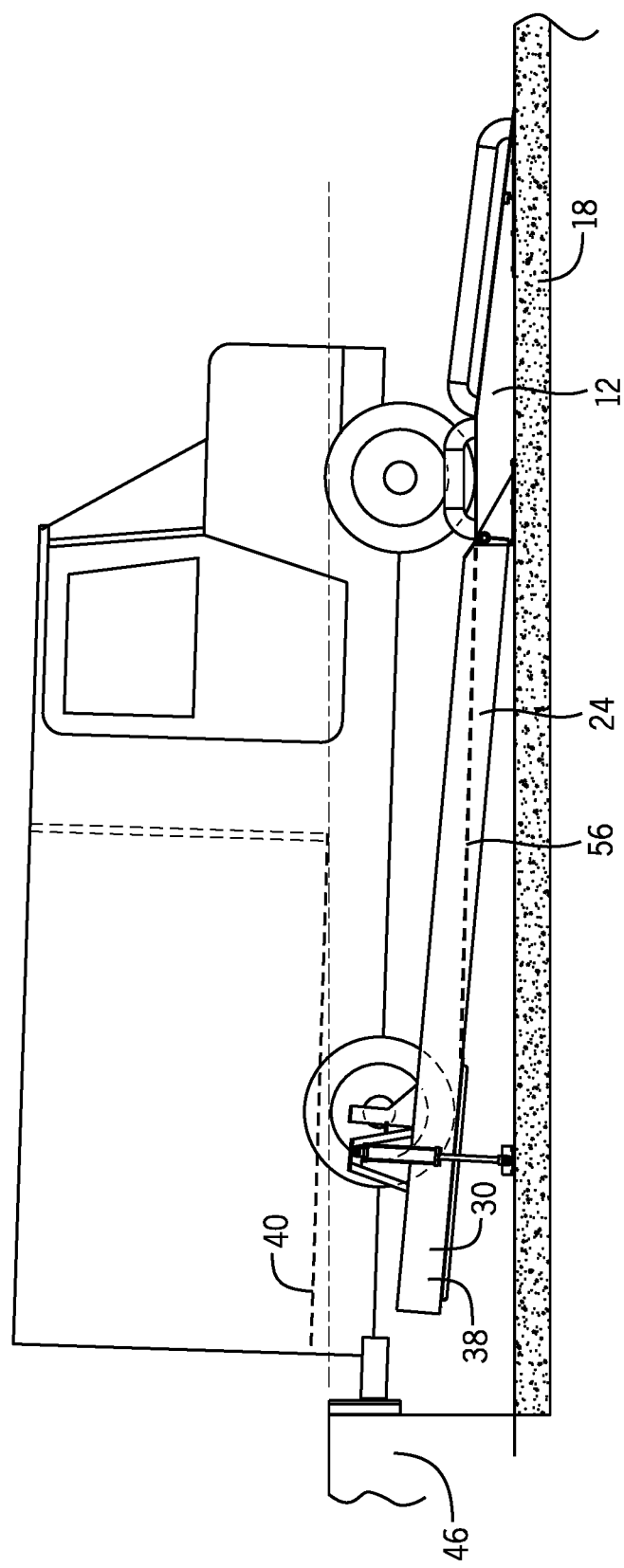
FIG. 4 is a perspective view of the vehicle leveler of FIG. 1 with a truck on the leveler and the leveler in the raised position.
Figure 5:
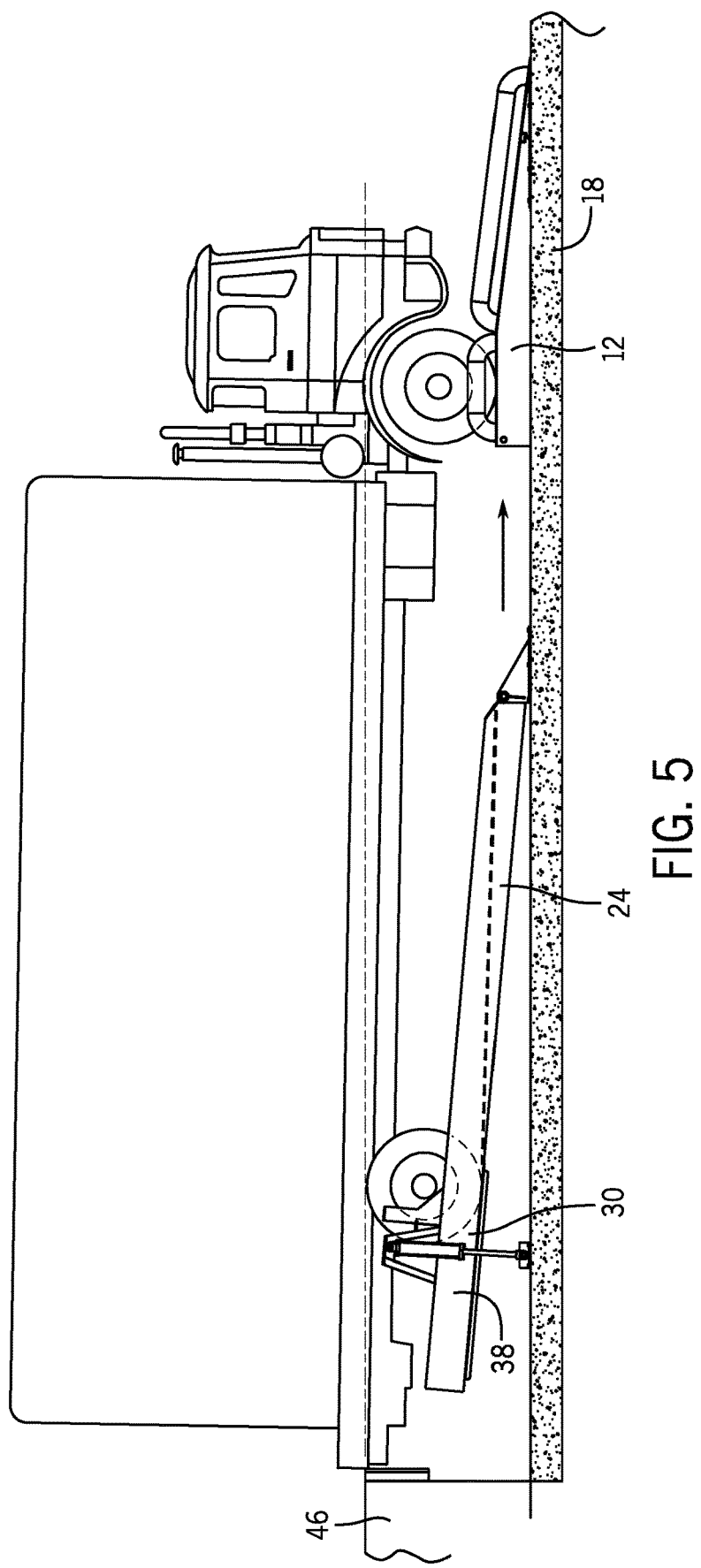
FIGS. 5-6 are perspective views of the vehicle leveler in the raised position.

FIG. 1 illustrates that second portion 24 has a leading edge 26 and a trailing edge 28. Leading edge 26 of second portion 24 is attached to trailing edge 16 of first portion 12 as seen in FIGS. 1, 3-4. First portion 12 and second portion 24 can be removably attached. FIG. 5 shows first and second portions 12, 24 separated. Leading edge 26 of second portion 24 is disposed further from driveway 18 than trailing edge 28 of second portion 24.

Second portion 24 also includes extension portion 30 as can be seen in FIGS. 1-7. Extension portion 30 extends from trailing edge 28 of second portion 24 toward a rear of leveler 10 (nearest loading dock wall 46) and includes a substantially flat section 32 disposed about parallel with substantially flat driveway 18.

FIG. 2 illustrates that first portion 12 and second portion 24 can include metal grating 42 over a steel plate for contact with wheels of a vehicle as the vehicle moves onto and off of leveler 10. Metal grating 42 over a steel plate is a material which is both durable and also provides increased traction for vehicles when moving onto or off of leveler 10.

FIGS. 1-7 illustrate that first portion 12 and second portion 24 are each unitary structures which are separate from each other as seen in FIG. 5 until they are attached together by a connection apparatus 34 as seen best in FIGS. 1 and 3-4. Connection apparatus 34 is located on leading edge 26 of second portion 24 and connects to trailing edge 16 of first portion 12. First portion 12 and second portion 24 can also be connected together by welding or other fastening systems. Flat section 22 of first portion 12 is in front of connection apparatus 34 since connection apparatus 34 is located on leading edge 26 of second portion 24.

Figure 6:
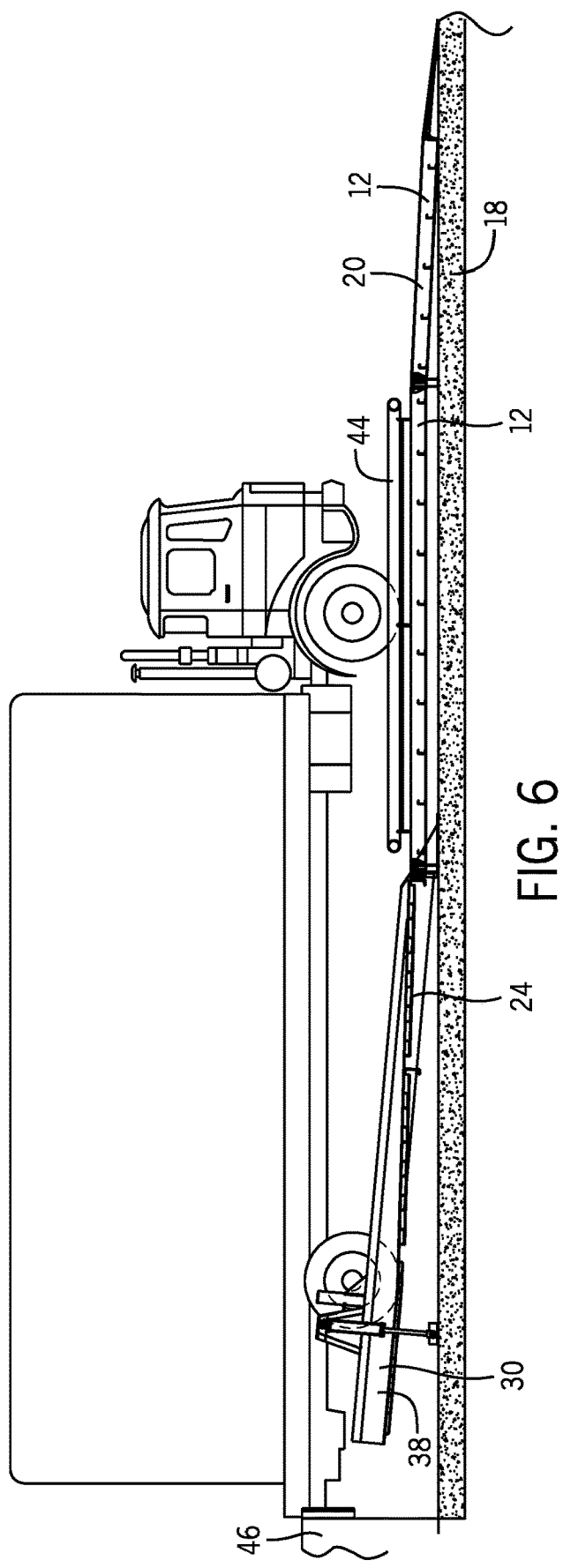
Figure 7:
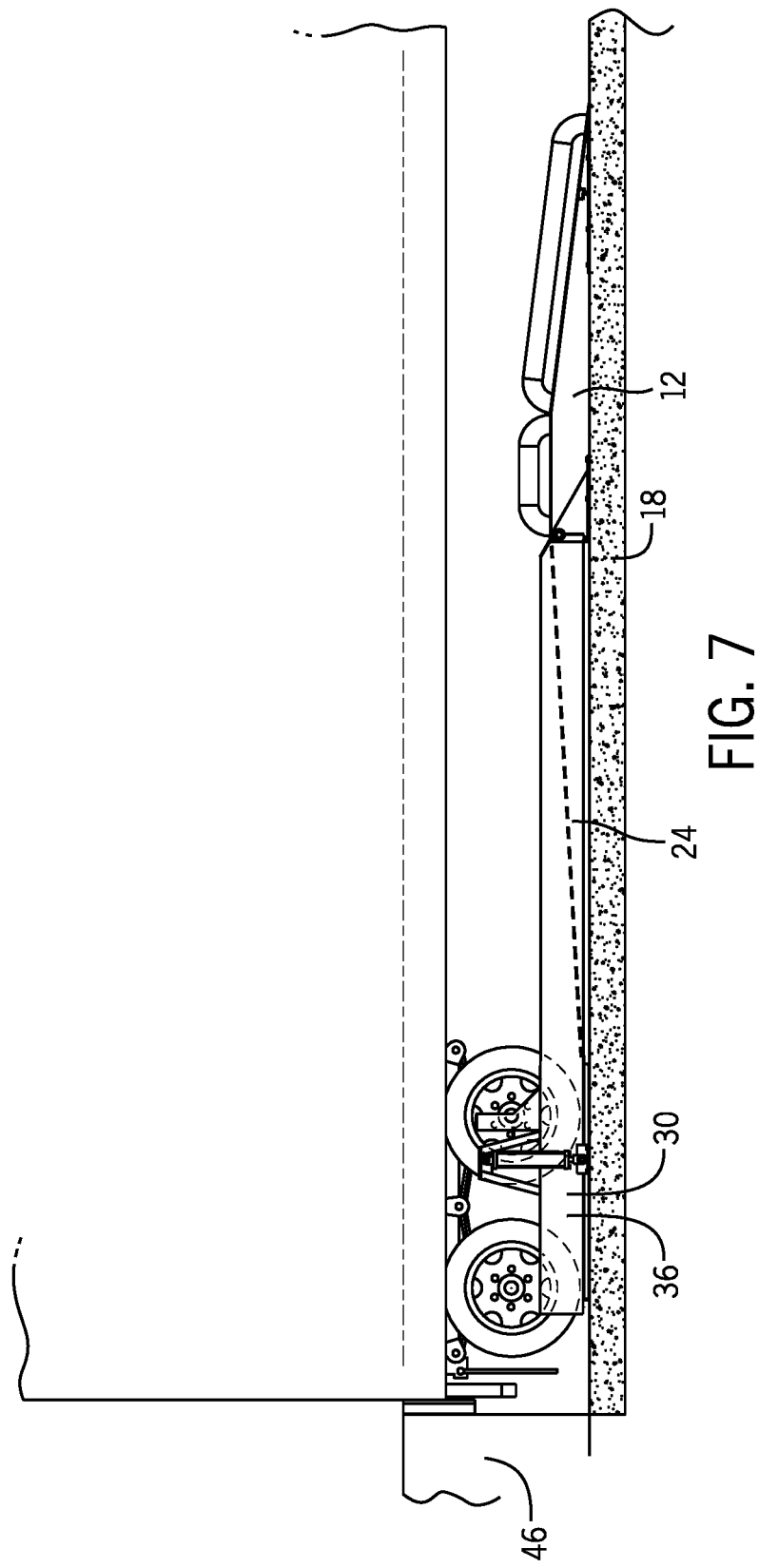
FIG. 7 is a perspective view of the vehicle leveler of FIG. 1 in the lowered position with a trailer on the leveler.

The drawings illustrate that second portion 24, including extension portion 30, can be moved between a lowered position 36 as seen in FIGS. 1, 3 and 7, and a raised position 38 as seen in FIGS. 4-6, to accommodate varying dock heights for loading and unloading of cargo from vehicles. FIGS. 4-7 show a variety of different types of vehicles which can utilize leveler 10.

Depending on the length of the vehicle, leveler 10 can be customized in a variety of ways, including that extension portion 30 can consist of multiple extension portions which are identical and which are attached together so as to accommodate a vehicle which has a longer length. FIG. 2 illustrates a leveler 10 with more than one extension portion 30. In an embodiment with multiple extension portions 30, each extension portion 30 is removably secured to another extension portion 30. In this type of embodiment, a first extension portion 30 would extend from trailing edge 28 of second portion 24 toward a rear of leveler 10, and extension portions 30 each would include a substantially flat section 32 disposed about parallel with substantially flat driveway 18. In some embodiments, the multiple extension portions 30 can be of varying lengths and do not have to be identical in length.

Leveler 10 can be manufactured so that ramp section 20 can be of varying lengths and heights to accommodate a single, rear axle vehicle as well as a large trailer. FIGS. 1 and 6 each illustrate a ramp section 20 with a different length and height. Ramp section 20 and flat section 22 can be manufactured with different lengths and heights to accommodate single rear axle vans and trailers as well as 53-foot over the road tractor trailers. Therefore, leveler 10 can be manufactured so that any of the first portion 12, second portion 24 or extension portion 30, can be of varying lengths and heights so as to accommodate a variety of vehicle types and sizes. For example, FIGS. 3-4 show a box-type truck on leveler 10, FIGS. 5-6 show a larger vehicle on leveler 10 and FIG. 7 illustrates a very large trailer on leveler 10.

With leveler 10 it is possible to elevate both the front and rear axles of a vehicle to minimize the incline or decline of an inside floor surface 40 of a trailer or vehicle, thereby making loading and unloading of cargo safer. FIGS. 3-7 illustrate a variety of vehicles on leveler 10 and the dotted line in FIGS. 3-4 illustrates inside floor surface 40 of the vehicle. FIGS. 4-6 illustrate vehicles on leveler 10 that have both a front and rear axle elevated.

FIG. 6 illustrates that leveler 10 can include opposed sidewalls 52 (see FIG. 2) with a light-mounting channel 44 having at least one light 50 (which could be a single light, multiple lights or a rope light) integrated into light-mounting channel 44. Light(s) 50 assist vehicles, such as trailers, when they are backing in or pulling away from leveler 10.

A lifting system is also incorporated into the leveler 10 in the form of hydraulic lifts 48 which contact driveway 18 as seen in FIG. 1. The hydraulic lifts 48 lift the second portion 24 including extension portion 30 of leveler 10. However, any other lifting systems known in the art could be utilized as well.

Leveler 10 may also include wheel guides 54 shown in FIG. 1 which can be on any or all of first portion 12, second portion 24 or extension portion 30. FIG. 1 illustrates wheel guides 54 on first portion 12. Wheel guides 54 act to guide the wheels of the trailer into the proper position for loading and unloading of cargo.

The relationship between first portion 12 and driveway 18 as well as second portion 24 and driveway 18 can also be defined in terms of angles, as shown in FIGS. 1-7. Ramp section 20 of first portion 12 is inclined from driveway 18 about 1-15 degrees from parallel with driveway 18. Second portion 24 extending from first portion 12 toward a rear of leveler 10 includes a decline section 56 which declines toward the substantially flat driveway at between about 1-15 degrees from parallel with the substantially flat driveway 18.

In operation, a vehicle (including sometimes a large trailer) is backed up to leveler 10 to put the rear wheels onto first portion 12, specifically ramp section 20. The wheels and trailer are therefore elevated from driveway 18 as they are backed up onto ramp section 20. As the vehicle is further backed onto leveler 10, the rear wheels pass onto second portion 24 or decline section 56 and begin to be lowered back toward driveway 18. As the rear wheels continue to be backed up, they contact extension portion 30 and at this point, depending on the length and size of the trailer or vehicle, the rear of the trailer or vehicle may now be in contact with loading dock wall 46. Depending on the length of the vehicle or trailer, the front wheels may either be in contact with first portion 12 as can be seen in FIGS. 3-4 or the trailer may be so large that only the back wheels are on leveler 10 as seen in FIG. 7. Once though the rear wheels are backed up as far onto leveler 10 as they can go, the lifting system can then be operated to lift the trailer to the proper height to safely load and unload cargo. Leveler 10 can elevate both the front and rear wheels of a vehicle to minimize the slope of the internal floor of the vehicle, which allows for safer loading and unloading.

FIGS. 8-14 illustrate that vehicle leveler 10 includes opposing side portions 58 which extend the length of and contact first portion 12, second portion 24 and extension portion 30.

Figure 8:
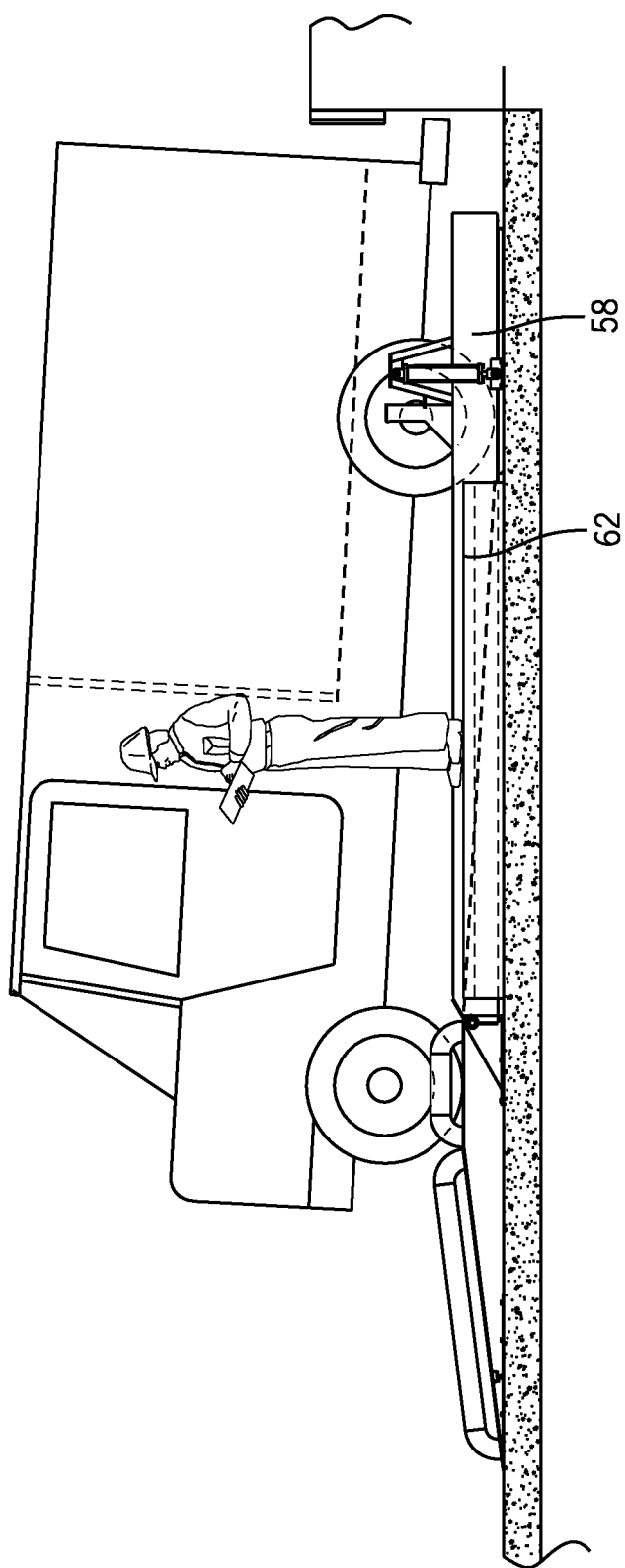
FIG. 8 is a perspective view of the vehicle leveler of FIG. 1 with a vehicle driver using the top surface/walkway.
Figure 9:
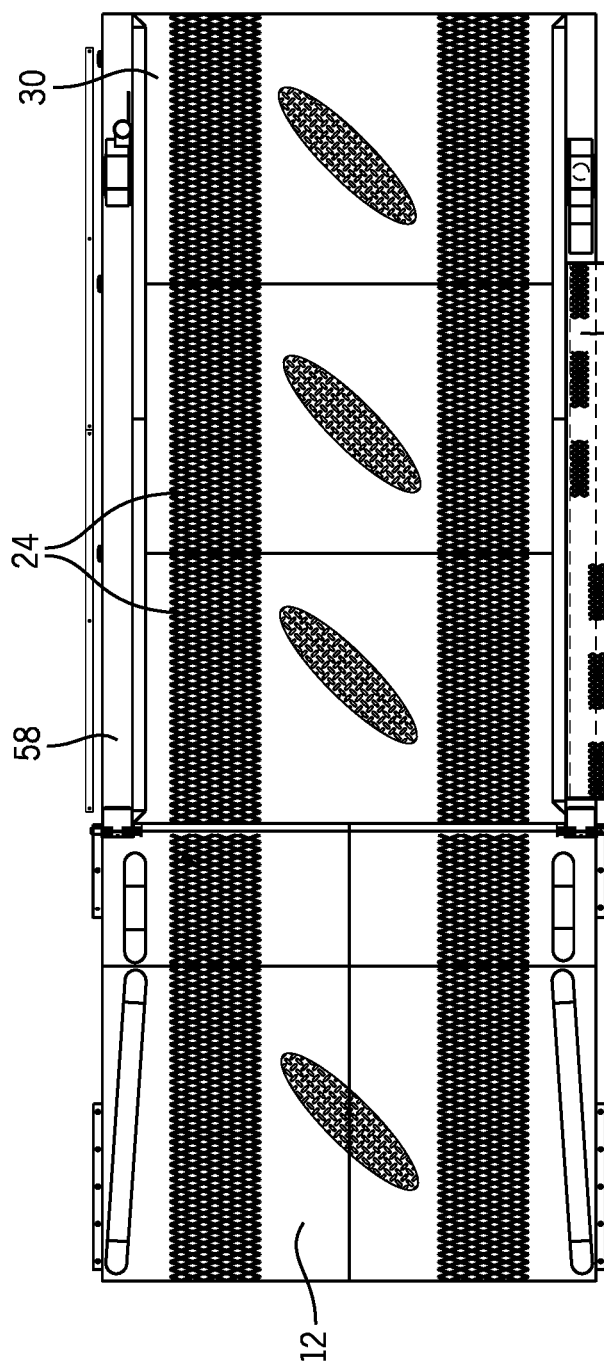
FIG. 9 is a top view of the vehicle leveler illustrating the top surface/walkway extending partially along the length of the leveler.
Figure 10:
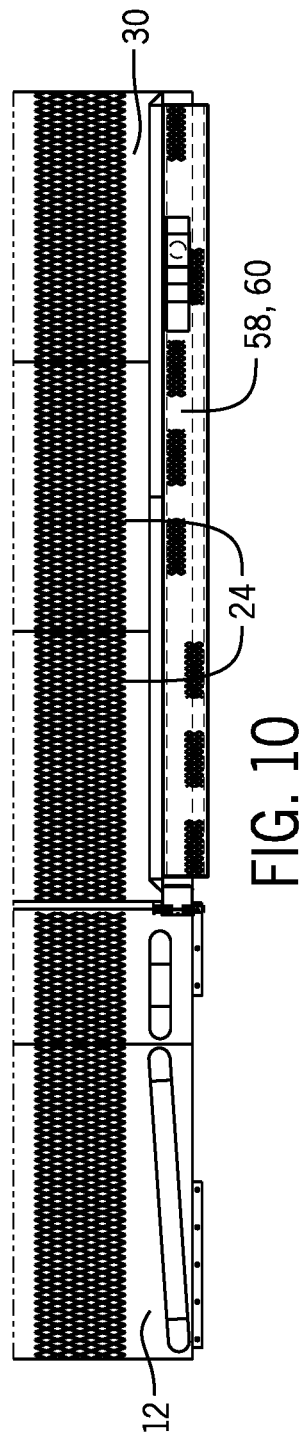
FIG. 10 is a top view of the vehicle leveler illustrating the top surface/walkway extending farther along the length of the leveler.

As seen best in FIGS. 9-10, opposing side portions 58 have a top surface 60 which forms a walkway 60. The walkway, also referred to herein as top surface 60, is a safety feature which is used by a driver when he enters or exits a vehicle which is using vehicle leveler 10. FIG. 8 illustrates a driver using walkway 60. FIG. 10 illustrates that top surface/walkway 60 can extend the complete length of second portion 24 and extension portion 30, whereas FIG. 9 illustrates that top surface/walkway 60 can only extend a portion of the length of second portion 24 and extension portion 30.

Figure 12:
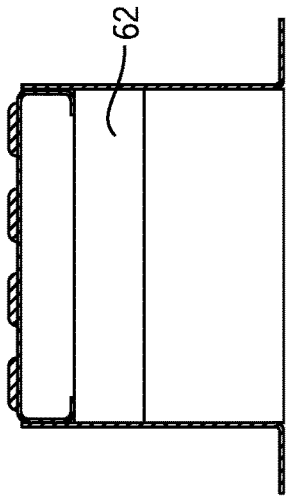
FIG. 12 is a front view of the extended walkway surface.
Figure 11:
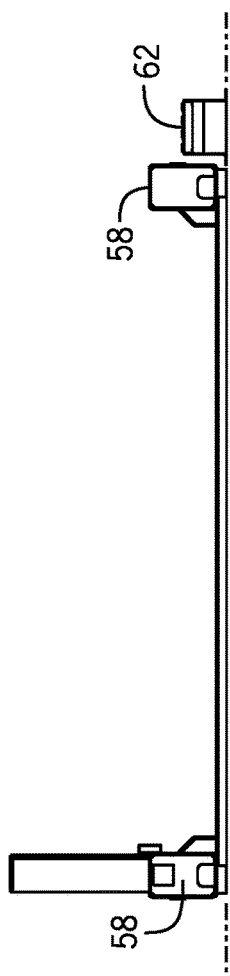
FIG. 11 is a front view of the leveler illustrating the opposing side portions and extended walkway surface.
Figure 13:
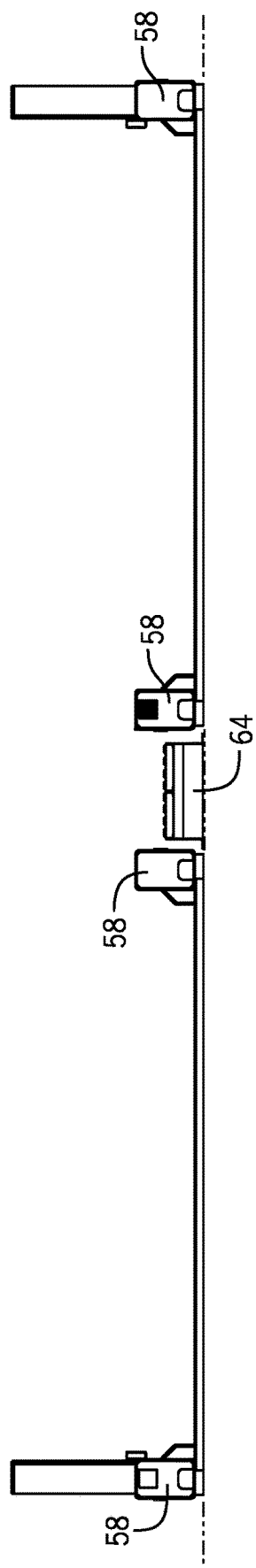
FIG. 13 is a front view of two levelers installed side-by-side and illustrating the large walkway.
Figure 14:
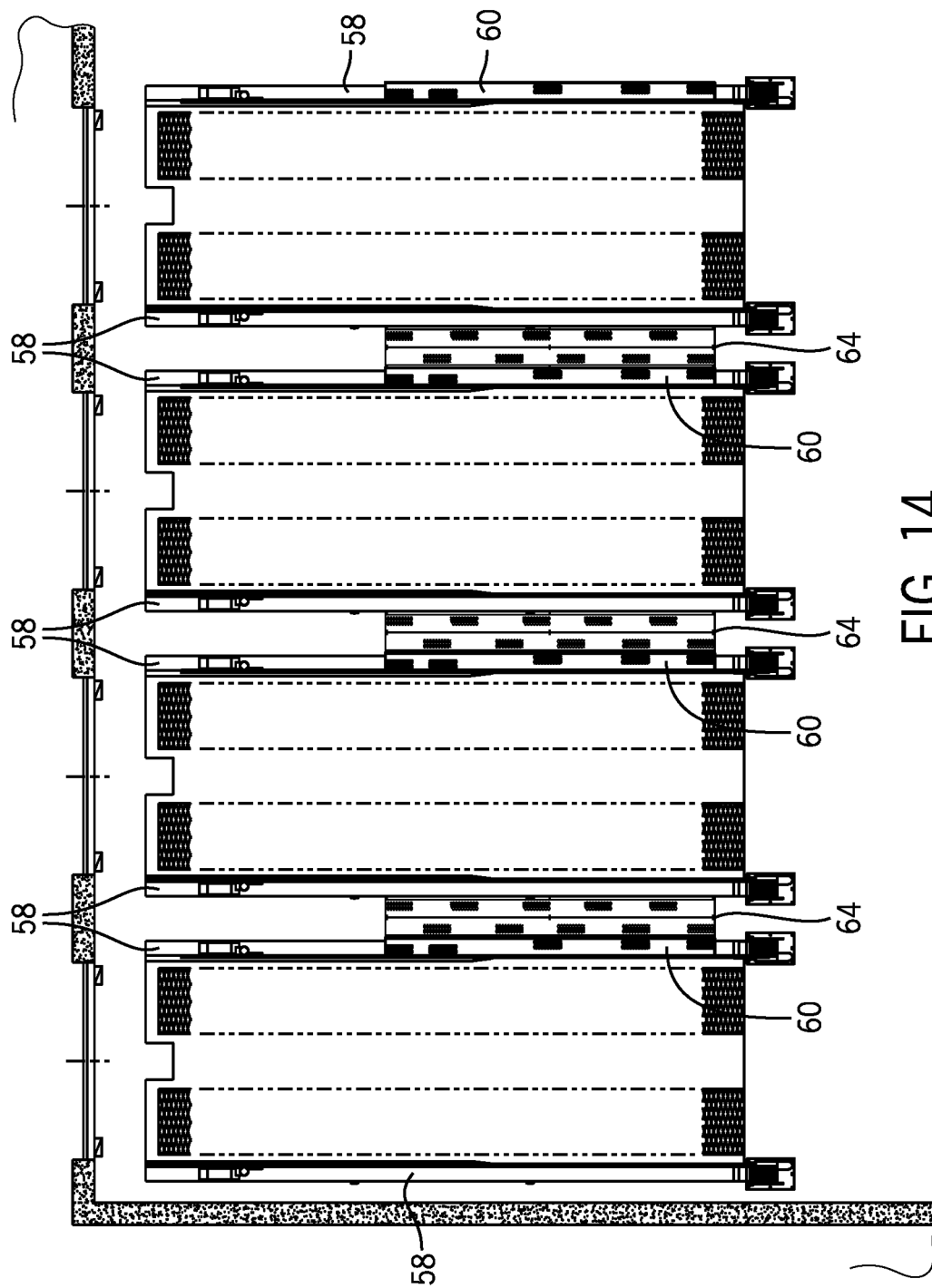
FIG. 14 is a top view illustrating four vehicle levelers installed adjacent to each other with a large walkway in between the levelers.

FIG. 11 illustrates opposing side portions 58 as well as top surface/walkway 60. FIG. 12 is a more detailed view of just the extended walkway surface 62 which is mounted between two vehicle levelers 10 to form a large walkway 64. FIGS. 13-14 illustrate that two or more vehicle levelers 10 can be installed adjacent to each other, and extended walkway surface 62 can be removably installed between each vehicle leveler 10 to form a large walkway 64 for a vehicle driver to use. In FIG. 14, each vehicle leveler 10 has two, opposing side portions 58 with top surfaces 60 which each form a separate walkway. FIG. 14 illustrates four vehicle levelers 10 installed adjacent to each other.

FIG. 14 also illustrates that extended walkway surface 62 which forms large walkway 64 is a step (two or more walkway surfaces 62 can be put together to make large walkway 64 or walkway surface 62 can be manufactured to be wider and can be large walkway 64) which is wide so as to give the vehicle driver a wider walk surface to assist them as they step onto that and walk out to get around adjacent trailers.

Figure 15:
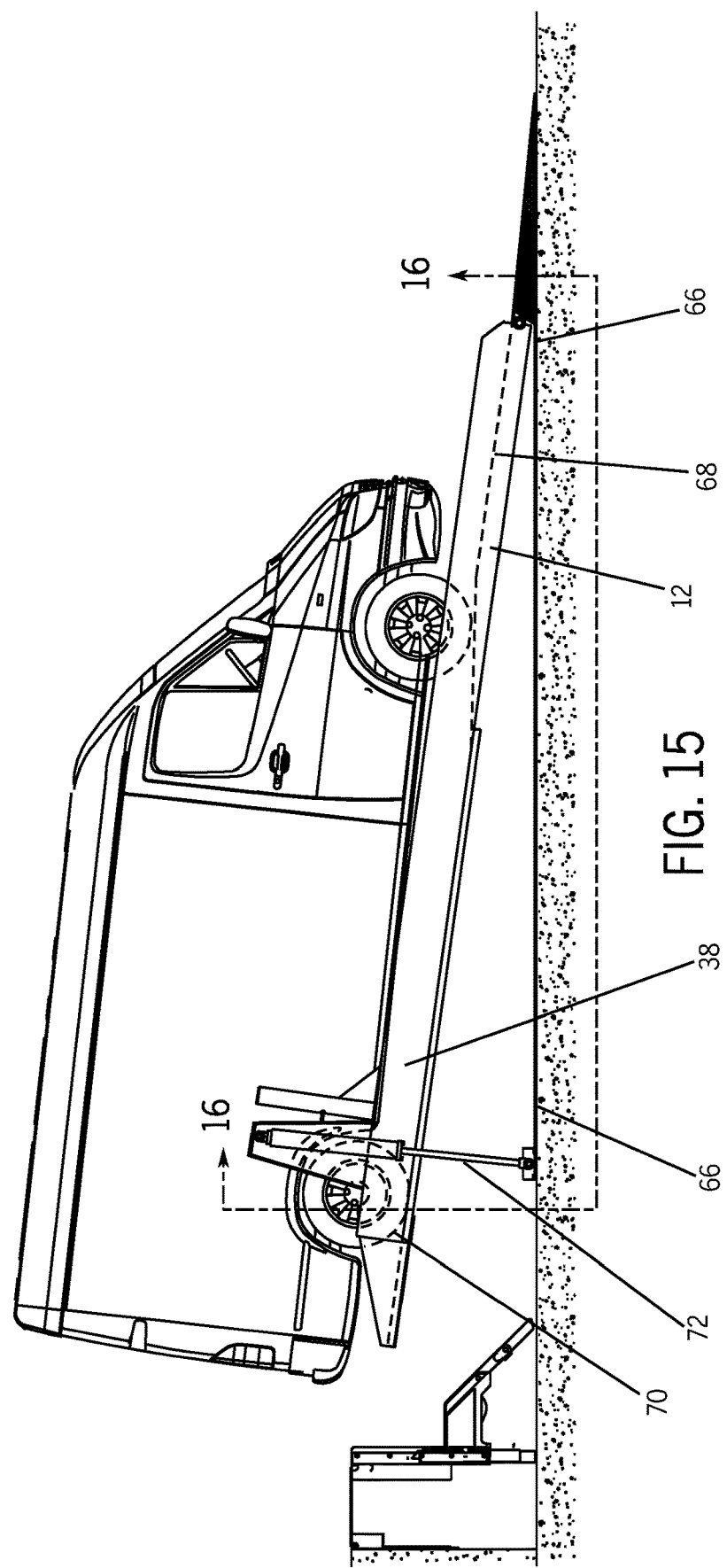
FIG. 15 is a side view of the vehicle leveler in the raised position.

FIGS. 15-16 illustrate that at least one tension bar 66 connects first portion 12 on a proximal end 68 of tension bar 66 to a lift cylinder 72 on a distal end 70 of tension bar 66. Tension bar 66 on proximal end 68 can be connected to first portion 12 (either leading edge 14 or trailing edge 16) or other sections of leveler 10 including ramp section 20. Vehicle leveler 10 can include either one tension bar 66 or a tension bar 66 on each side of leveler 10.

Tension bar 66 connects first portion 12 to lift cylinder 72 on distal end 70. This maintains leveler 10 stability when leveler 10 is in raised position 38. This added stability is particularly important when leveler 10 is installed on asphalt, gravel or other non-structural foundation surfaces. By connecting lift cylinder base 72 to first portion 12 of leveler 10, cylinder 72 cannot slide when leveler 10 is in an elevated position 38. This also allows for additional anchors and spreads the load out from a trailer on leveler 10 to reduce point loading on the asphalt or other non-structural foundations that the leveler 10 may be placed on. Lift cylinder 72 cannot accidentally shift when vehicle leveler 10 is in an elevated position 38.

FIG. 17 illustrates a tension strap 74 or several tension straps 74 which can span the width of leveler 10 under the deck surface of leveler 10. FIG. 17 does not show the deck surface (it is removed) of ramp section 20 so as to make it easier to see tension strap 74. Tension strap 74 connects on each end to opposing side portions 58. Tension strap 74 provides additional stability when a vehicle is on leveler 10 and leveler 10 is in a raised position 38.

Tension bar 66 and tension strap 74 can be made of any material which is strong and durable, however steel (ASTM A36) is preferred.

A wide variety of materials are available for the various parts discussed and illustrated herein. Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A vehicle leveler for use with a driveway comprising:
   a first portion having a leading edge and a trailing edge wherein the trailing edge is disposed further from the driveway than the leading edge and forms a ramp section,
   a second portion having a leading edge and a trailing edge wherein the leading edge of the second portion is attached to the trailing edge of the first portion and the leading edge of the second portion is disposed further from the driveway than the trailing edge of the second portion, the second portion also including an extension portion which extends from the trailing edge of the second portion toward a rear of the leveler and includes a substantially flat section disposed about parallel with the substantially flat driveway;
   opposing side portions which extend the length of and contact the first portion, second portion and extension portion, the opposing side portions having a top surface which forms a walkway; and
   at least one tension bar connecting the first portion on a proximal end and a lift cylinder on a distal end,
   wherein the lift cylinder cannot accidentally shift when the vehicle leveler is in an elevated position.

2. The vehicle leveler of claim 1 further including at least one tension strap under the first portion, second portion or extension portion.

3. The vehicle leveler of claim 1 wherein the at least one tension is two opposing tension bars.

4. The vehicle leveler of claim 1 wherein two or more vehicle levelers can be installed adjacent to each other and an extended walkway surface can be removably installed between each vehicle leveler.

5. The vehicle leveler of claim 4 wherein the extended walkway surface and top surface form a large walkway surface for a vehicle driver to use.

6. The vehicle leveler of claim 1 wherein each vehicle leveler has two, opposing side portions each with a top surface, an opposing side portion and top surface together each form a separate walkway.

7. The vehicle leveler of claim 1 wherein the walkway can extend the complete length of both the second portion and extension portion, or alternatively, the walkway can extend only a portion of the length of the second portion and extension portion.

8. The vehicle leveler of claim 1 wherein the first portion and second portion are each unitary structures which are separate from each other.

9. The vehicle leveler of claim 1 wherein the second portion including the extension portion can be moved between a lowered position and a raised position to accommodate varying dock heights for loading and unloading of cargo from vehicles.

10. The vehicle leveler of claim 1 wherein the walkway and extended walkway surface include metal grating for safe contact for a vehicle driver walking on the walkway or extended walkway surface.

11. A vehicle leveler for use with a substantially flat driveway, the leveler capable of movement between a lowered position and a raised position, the leveler in the lowered position comprising:
   a first portion having a leading edge at a front of the leveler and an inclined section wherein the inclined section is inclined from the substantially flat driveway at between about 1 and 15 degrees from parallel with the substantially flat driveway;
   a second portion extending from the incline section toward a rear of the leveler including a substantially flat section wherein the substantially flat section is declined toward the substantially flat driveway at between about 1 and 15 degrees from parallel with the substantially flat driveway;
   an extension portion extending from the second portion toward a rear of the leveler and including a substantially flat section disposed about parallel with the substantially flat driveway;
   opposing side portions which extend the length of and contact the first portion, second portion and extension portion, the opposing side portions having a top surface which forms a walkway; and
   at least one tension bar connecting the first portion on a proximal end and a lift cylinder on a distal end,
   wherein the lift cylinder cannot accidentally shift when the vehicle leveler is in an elevated position.

12. The vehicle leveler of claim 11 further including at least one tension strap under the first portion, second portion or extension portion.

* * * * *